(12) United States Patent
Leflon et al.

(10) Patent No.: US 7,561,992 B2
(45) Date of Patent: Jul. 14, 2009

(54) PROCESS, DEVICE AND PACKAGE FOR STOCHASTIC SIMULATION OF ANCIENT RIVERBEDS OR ANCIENT GEOLOGICAL STRUCTURES

(75) Inventors: Bruno Leflon, Nancy (FR); Emmanuel Gringarten, Houston, TX (US); Jean-Laurent Mallet, Nancy (FR)

(73) Assignee: Earth Decision Sciences, Vandoeuvre-les-Nancy (FR)

( * ) Notice: Subject to any disclaimer, the term of this patent is extended or adjusted under 35 U.S.C. 154(b) by 213 days.

(21) Appl. No.: 11/100,467

(22) Filed: Apr. 7, 2005

(65) Prior Publication Data

US 2005/0228623 A1  Oct. 13, 2005

(30) Foreign Application Priority Data

Apr. 7, 2004 (FR) ................... 04 03649

(51) Int. Cl.
*G06F 17/10* (2006.01)
*G06G 7/48* (2006.01)
(52) U.S. Cl. .......................... 703/2; 703/10
(58) Field of Classification Search ............. 703/2, 703/10
See application file for complete search history.

(56) References Cited

U.S. PATENT DOCUMENTS 6,035,255 A * 3/2000 Murphy et al. ............. 702/11

OTHER PUBLICATIONS

Holden, L., Hauge, R., Skatem, O. and Skorstad, A., (1998), Modeling of fluvial reservoirs with object models. Math. Geol., vol. 30, No. 5, pp. 473-496.

Sophie Viseur, "Stochastic Boolean Simulation of Fluvial Deposits: A new Approach Combining Accuracty with Efficiency", 1999, pp. 1-8, SPE 56688.

Levy, B., Mallet, J. L., (1998). Non distorted texture mapping for sheared triangulated meshes. ACM-SIGGRAPH 1998 Conference Proceedings, Orlando, Fla., pp. 343-352.

Deutsch, C. V., Journel, A., Geostatistical Software Library and User's Guide, Oxford University Press, New York (1998), pp. 245-262.

Mallet, J. L., (2002), Geomodeling. Oxford University Press, New York; (pp. 263-278, 287-300, and, 502-528).

* cited by examiner

*Primary Examiner*—Hugh Jones
(74) *Attorney, Agent, or Firm*—Pearl Cohen Zedek Latzer, LLP (57) ABSTRACT

A process for stochastic simulation of ancient riverbeds or ancient geological structures includes the following stages:
(a) parameterize the geological reference horizon by linking to it a two-dimensional parametric system of paleogeographic coordinates;
(b) construct a modeling function, the isovalue curves of which are approximately parallel to the general direction of the ancient riverbed to be simulated;
(c) use the absolute value of the modeling function of the general direction of the ancient riverbed to be located in order to define a topographic function of the pseudo-valley;
(d) transform the topographic function of the pseudo-valley by using a transfer function to determine the thicknesses, dimensions and characteristics of the ancient riverbed to be located and/or the ancient geological structures associated with this ancient riverbed.

8 Claims, 3 Drawing Sheets

Section of the pseudo-valley

Section of the riverbed

Transfer function

PROCESS, DEVICE AND PACKAGE FOR STOCHASTIC SIMULATION OF ANCIENT RIVERBEDS OR ANCIENT GEOLOGICAL STRUCTURES

The present application claims priority from French application FR 04 03649, filed on Apr. 7, 2004.

The invention relates to a process for constrained stochastic simulation of ancient riverbeds or ancient associated geological structures in the neighborhood of a geological reference horizon.

The invention likewise relates to a device for constrained stochastic simulation of ancient riverbeds or ancient associated geological structures in the neighborhood of a geological reference horizon.

The invention finally relates to a computer package for constrained stochastic simulation of ancient riverbeds or ancient associated geological structures in the neighborhood of a geological reference horizon.

In geological modeling, the object to be modeled is usually defined in a known manner by its external envelope, which is usually a closed surface. The surface of the object to be modeled is defined by a set of adjacent faces.

These techniques of modeling by adjacent faces are known as "Boolean methods" or "object methods" and do not make it possible to easily determine if a point in three-dimensional space does or does not belong to the object to be modeled: these problems of determination are described in, for example, the following documents: "Holden, L., Hauge, R., Skatem, O. and Skorstad, A., (1998), Modeling of fluvial reservoirs with object models. Math. Geol., Vol. 30, No. 5, pp. 473-496", and "Viseur, S., Shtuka, A. and Mallet J. L., (1998), New Fast Stochastic Boolean Simulation of Fluvial Deposit, SPE Annual Technical Conference and Exhibition, New Orleans, article No. 49281".

Moreover, the complexity of the computations carried out requires considerable computer time and a large amount of available computer memory. Finally, and above all, these methods do not make it possible to take into account significant sinuosities; this leads to the generation of relatively unrealistic geological simulations.

The first purpose of the invention is to refine the state of the art, by conducting prior parameterization of a geological reference horizon H, with a view to stochastically generating ancient riverbeds or ancient associated geological structures in the neighborhood of this geological reference horizon.

At the end of this parameterization described in, for example, the documents: "Levy, B., Mallet, J. L., (1998). Non distorted texture mapping for sheared triangulated meshes. ACM-SIGGRAPH 1998 Conference Proceedings, Orlando, Fla., pp. 343-352", and "Mallet, J. L., (2002), Geomodeling. Oxford University Press, New York", any point P on the reference horizon H is then characterized by a pair $(u,v)$ of parametric coordinates and three $(x, y, z)$ Cartesian coordinates, themselves a function of the parameters $(u,v)$.

The pair $(u,v)$ then characterizes the position of point P on the reference horizon H, while the three coordinates $(x, y, z)$ characterize the position of P in the geological space. Consequently, we will denote any point P located on the reference horizon H as $P(u, v)$, and we will state that $(u,v)$ is a system of paleogeographic coordinates that is associated with H.

A second purpose of the invention is to stochastically simulate at any point $P(u,v)$ of the reference horizon H the algebraic thickness $e(u,v)$ of different types of sediments associated with an ancient riverbed or with ancient geological structures in the vicinity of H, such that $e(u,v)$ is positive for sediments located on one side of H and negative for those located on the other side.

The object of the invention is a process for constrained stochastic simulation of ancient riverbeds or ancient associated geological structures in the neighborhood of a geological reference horizon, comprising the following stages:

(a) parameterize the geological reference horizon by linking to it a two-dimensional parametric system of paleogeographic coordinates $(u,v)$;

(b) construct a modeling function $d(u, v)$, that defines the general direction of the ancient riverbed to be simulated such that at any point $P(u,v)$ the gradient vector $G(u,v)$ of this function is roughly perpendicular to the direction of flow of the ancient riverbed and that the length of $G(u,v)$ never becomes zero over the domain under study;

(c) if necessary, add a constant to the modeling function in order to ensure that the isovalue curve of the equation $d(u, v)=0$ is an approximation of the center line of the ancient riverbeds to be simulated;

(d) construct a random function $R(u,v)$, called the "stochastic perturbation" function of roughly zero mean, and such that one of the two primary directions of anisotropy of the autocorrelation function of $R(u,v)$ is parallel to the gradient $G(u, v)$ of $d(u,v)$, whereas the correlation ranges associated with these two primary directions of anisotropy are functions of the wavelength, of the sinuosity, and of the amplitude of the ancient riverbeds to be simulated;

(e) in order to generate a particular simulation, randomly take an equiprobable realization $r(u, v)$ of the random function $R(u,v)$, that is called a stochastic perturbation function;

(f) construct a function $z(u,v)=d(u,v)+r(u,v)$, called a perturbed modeling function (actually, considering that the random stochastic perturbation function $R(u,v)$ plotted at (d) is roughly of zero mean, it can be considered that $z(u,v)$ is a "perturbed" version of $d(u, v)$, of which the local maxima and minima will generate meandering isovalue curves for $z(u,v)$. Moreover, taking (c) into account, it can be considered that the isovalue curve of the equation $z(u,v)=0$ is simply the meander axis of the riverbed being modeled);

(g) use the absolute value of $z(u,v)$ for defining at any point $P(u, v)$ of the reference horizon H a function $w(u,v)=|z(u,v)|$, that describes the topography of the pseudo-valley associated with the simulated ancient riverbed;

(h) use a transfer function for transforming said topographic function $w(u,v)$ of the pseudo-valley into the thickness $e(u,v)$ of a type of sediment associated with the ancient riverbed, or with ancient geological structures associated with this ancient riverbed, while taking into account the constraints of dimension and shape of these geological bodies.

According to other alternative characteristics of the invention:

if there is a data point Q located in the vicinity of the reference horizon H on which the minimum and maximum thicknesses of the ancient riverbed are known, then it is sufficient to compute the projection $P(u^*,v^*)$ of Q on H, and then to apply the inverse function of the transfer function to the thicknesses.

This yields one or more intervals. It is then sufficient to constrain each realization $r(u,v)$ of the stochastic perturbation function $R(u,v)$ so that $d(u^*,v^*) +r(u^*,v^*)$ belongs to one of these intervals. If there are several data points on which the thickness of the ancient riverbed is constrained, it is sufficient to repeat the aforementioned procedure for each of these data points.

the topographic function w(u, v) of the pseudo-valley can be replaced by any monotonic increasing transformation of the absolute value of the perturbed modeling function z(u,v);

the modeling function d(u, v) that defines the general direction of the ancient riverbed to be simulated is defined by conditions at the limits that are roughly parallel to the general direction of the ancient riverbed to be simulated, that is comprised of two lines Ll and Lr located to the left and right respectively of the center line of the ancient riverbeds and between which the ancient riverbeds are to be simulated.

The space between the lines Ll and Lr is called the "fairway", and if necessary, the values of the modeling function d(u,v) can be adjusted such that the realizations of the simulated ancient riverbeds are all located within the fairway that has been defined in this way;

the isovalue curve z(u,v)=0 can be extracted and used to model the major axis of the simulated ancient riverbed;

it is possible to model the lateral and downstream migration of each simulated ancient riverbed.

The lateral migration is obtained by replacing the perturbed modeling function z(u,v) with a parameterized perturbed modeling function $z_q(u,v)=d(u,v)+q \times r(u,v)$, where q is a parameter that varies between two real parameters (conventionally between 0 and 1).

Figure 6:
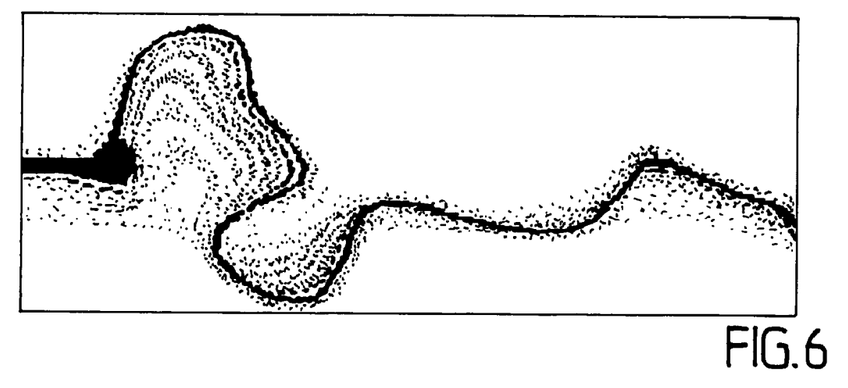
FIG. 6 schematically shows one example of a stochastic simulation of a riverbed with lateral and downstream migration.

The topographic function is then replaced by $w^*=\min(|z_q(u, v)|)$, where the minimum is taken relative to the set of values of the parameter q. Migration downstream is obtained by a progressive transformation of the function r(u, v) (the simplest transformation being the translation of r in the direction of flow of the fairway). The two migrations can be roughly superimposed as shown in FIG. 6.

The object of the invention is likewise a device for constrained stochastic simulation of ancient riverbeds or ancient geological structures associated with the nearby presence of a geological reference horizon H, comprising:

means for parameterizing the geological reference horizon H by linking to it a two-dimensional parametric net (u,v) of paleogeographic coordinates;

means for constructing a modeling function d(u,v) of the general direction of the ancient riverbed to be simulated, such that its gradient never becomes zero over the domain under study and that the mean trajectory of the ancient riverbed roughly corresponds to the set of points P(u,v) for which d(u,v) becomes equal to zero;

means for constructing the stochastic perturbation function R(u,v) such that the primary directions of its autocorrelation function are parallel and perpendicular, respectively, to the gradient vector G(u,v) of the function d(u,v);

means for constraining R(u,v) to belong to one or more given intervals at any projection point P(u, v) on H of a point on which the thickness of the ancient riverbed is known;

means for randomly taking an equiprobable realization r(u,v) of the stochastic perturbation function R(u,v);

means for constructing the function z(u,v)=d(u,v)+r(u,v);

means for using the absolute value |z(u,v)| for defining at any point P(u,v) of the reference horizon H a function w(u,v)=|z(u,v)|, that describes the topography of the pseudo-valley associated with the ancient riverbed;

means for using a transfer function for transforming said topographical function w(u,v) of the pseudo-valley into the algebraic thickness e(u,v) of one type of sediment associated with the ancient riverbed, or with one of the ancient geological structures associated with this ancient riverbed, taking into account the dimensions of these geological bodies.

Finally, the object of the invention is a computer package, comprising program code elements for executing the stages of the process according to the invention, when said program is run by a computer.

According to another alternative characteristic of the invention, a package comprises program code elements for executing the stages of a process as claimed in the invention, when said program is installed on a device as claimed in the invention.

The invention will be better understood using the following description, which is given by way of a nonrestrictive example with reference to the attached drawings.

It is known that underground geological structures comprise a set of geological layers separated by surfaces called "horizons".

A horizon corresponds to a set of sedimentary particles deposited at the same geological time. Within the context of this invention, the reference horizon H is assumed to have been hollowed out by an ancient riverbed that then deposited sediments with a positive thickness located conventionally below H and with a negative thickness located conventionally above H.

The determination of the geometry of the horizons and properties of the geological layers is done using processes of geophysical measurements and measurements on drilled shafts, which are then treated using appropriate mathematical procedures that make it possible to obtain an image of the subsurface. Mathematical procedures that make it possible to obtain an image of the subsurface are described in, for example, the following document: "Mallet, J. L., (2002), Geomodeling. Oxford University Press, New York".

Figure 1:
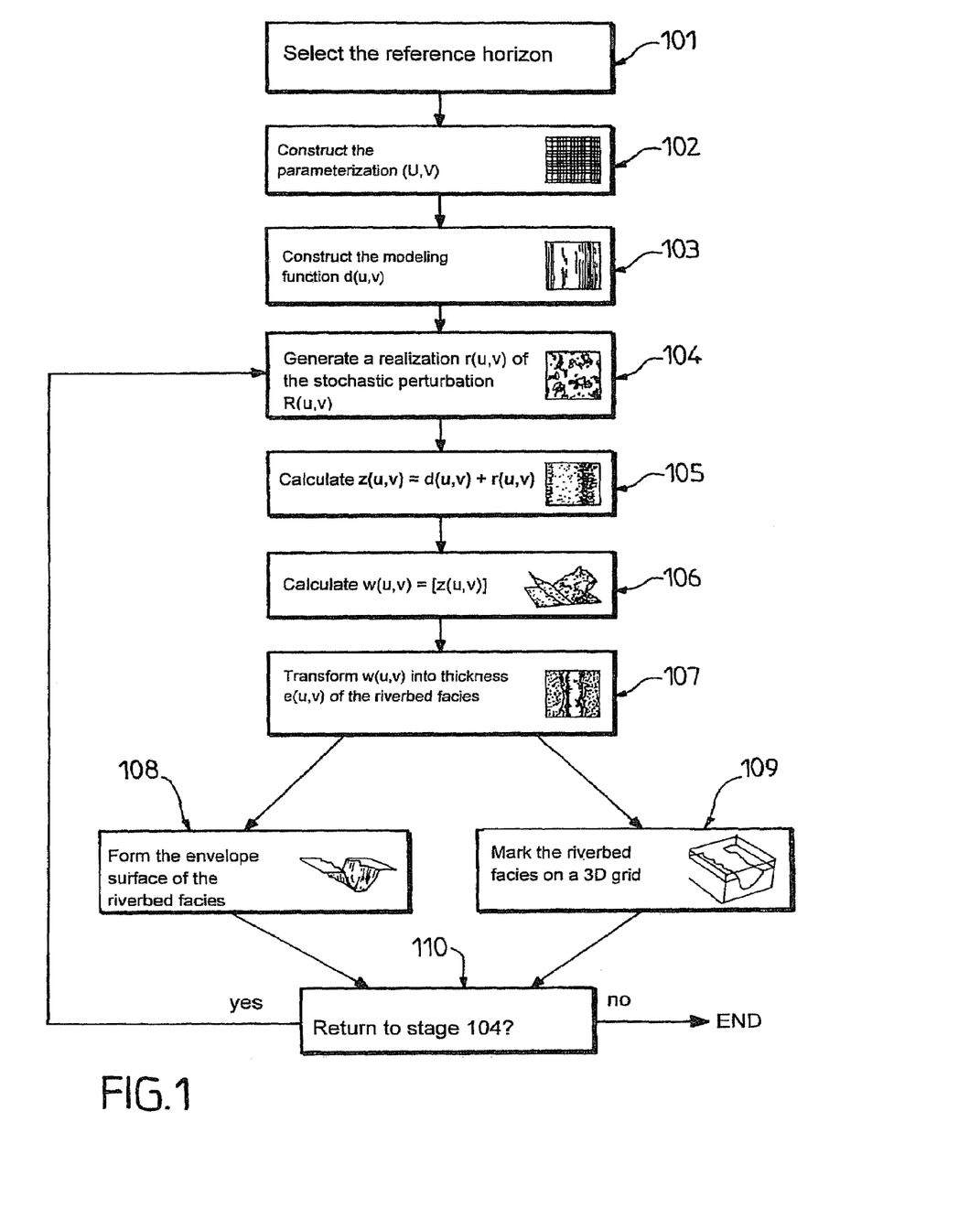
FIG. 1 schematically shows a flow chart of the implementation of the invention.

In FIG. 1 a flow chart that shows the implementation of the invention comprises several successive or simultaneous stages.

At stage 101, a reference horizon H is chosen, in the vicinity of which a particular sedimentation structure associated with an ancient riverbed and associated geological structures, such as the riverbed facies, bank facies, or lobe facies, is to be determined.

At stage 102, using a process known, for example, from the following documents: "Levy, B., Mallet, J. L., (1998). Non distorted texture mapping for sheared triangulated meshes. ACM-SIGGRAPH 1998 Conference Proceedings, Orlando, Fla., pp. 343-352", and "Mallet, J. L., (2002), *Geomodeling*. Oxford University Press, New York", a parameterization of the geological reference horizon H chosen at stage 101 is constructed, thus linking a pair (u,v) of paleogeographic coordinates to any point P=P(u,v) located on the geological reference horizon.

It can be observed that any point P(u,v) located at the point of coordinates (x, y, z) in three-dimensional geological space on the reference horizon H has an image P*(u,v) located at the point of the paleogeographic coordinates (u,v) in two-dimensional parametric space.

By virtually repeating the operation for any point P(u,v) of H, an image H* of the reference horizon is obtained in the plane (u,v) which is called the "parametric domain" of H.

Among all the possible parameterizations of H, the prefered choice is one called "isometric parameterization" according to the document: "Mallet, J. L., (2002), Geomodeling. Oxford University Press, New York". This so-called "isometric parameterization" is such that the image T* on H* of any triangle T on H is deformed as little as possible.

Figure 2:
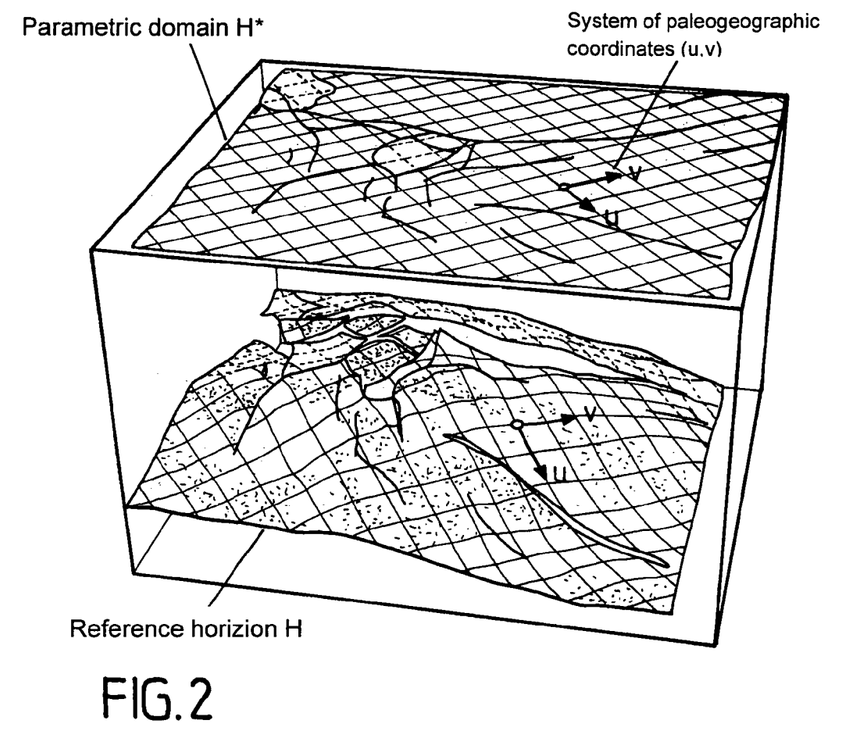
FIG. 2 schematically shows a stage of parameterization of one reference horizon, of the process according to the invention.

As shown by FIG. 2, it can be assumed that the two-dimensional plane supporting the parametric domain H is a horizontal plane and that H* is a good image of the horizon H at the time of depositing of the sediments before any tectonic event folds and ruptures H.

FIG. 2 shows the geological reference horizon H and its associated parametric domain H*. It will be noted in this figure that the image of a continuous line of the equation u=constant in the parametric domain H* is a curve plotted on the geological reference horizon H that can possibly be cut by faults. A similar observation can be made for the image of the continuous line of the equation v=constant in the parametric domain H*. Many parameterization procedures have been developed and are described especially in the document: "Mallet, J. L., *Geomodeling*. Oxford University Press, New York (2002)".

At stage 103, a representative modeling function of the general direction d(u,v) of the ancient riverbed to be simulated is defined at any point (u,v) of the parametric domain H* such that the isovalue curves of this function are roughly parallel to the general direction of flow of the ancient riverbed and that the length of G(u,v) never becomes zero on the domain under study.

To do this, for example it is possible to proceed as follows:
choose the geometry of two open curves Ll and Lr that do not intersect and that are located on either side of the major axis of the ancient riverbeds to be simulated;
construct d(u,v) by interpolation of the points located on Ll with a value (+V) and of the points located on Lr with a value (−V), where V is a randomly chosen constant.

By proceeding in this way, d(u,v) looks like a type of "signed distance" between the point P(u,v) located on the reference horizon and the axis of the ancient riverbed, whereby the sign of d(u,v) is (for example) positive if P(u,v) is located to the right of the ancient riverbed, and negative if not.

At stage 104, the random function R(u,v), that is called the stochastic perturbation function, is defined such that the primary directions of the autocorrelation function of R(u,v) are parallel and perpendicular, respectively, to the gradient G(u,v) of d(u,v), whereas the associated correlation distances are a function of the wavelength, of the sinuosity, and of the amplitude of the ancient riverbeds to be simulated. Then a realization r(u,v) of the random function R(u,v) is randomly generated in an equiprobable manner such that r(u,v) is constrained to appertain to given intervals at any projection point P(u,v) on H of a point on which the thickness of the ancient riverbed facies is given approximately.

The invention can be implemented very easily using known techniques by using for example a sequential Gaussian simulation (SGS) to generate equally probable realizations of R(u, v). A description of these methods for generating equiprobable realizations of a random function can be found in the work: "Deutsch, C. V., Journel, A., Geostatistical Software Library and User's Guide," Oxford University Press, New York (1998), or the work: "Mallet, J. L., Geomodeling. Oxford University Press, New York (2002)".

At stage 105, a nonrandom function z(u,v)=d(u,v)+r(u,v) is constructed by addition of the function d(u,v) that was constructed at stage 103 and of the function r(u,v) that was generated at stage 104. If necessary, the isovalue curve z(u, v)=0 can be extracted to model the axis of the simulated riverbed.

At stage 106, the absolute value |z(u,v)| of the function z(u,v) that was calculated at stage 105 is used for defining at any point P(u,v) of the reference horizon H a nonrandom function w(u,v)=|z(u,v)| that describes the topography of a pseudo-valley associated with the ancient riverbed that is being constructed.

At stage 107, a transfer function Tc(w|grad,th,wdth) is used that is appropriate for transformation of the function w(u,v), that was calculated at stage 106, into an algebraic thickness e(u,v) of the ancient riverbed such that: e(u,v)=Tc( w(u,v)|grad,th,wdth)

The transfer function Tc(w|grad,th,wdth) is chosen, for example, such that e(u,v) is positive at any point P(u,v) of the reference horizon H where there are riverbed facies below H and is equal to zero everywhere else. Actually, the transfer function Tc(w|grad,th,wdth) should locally take into account the length "grad(u,v)" of the gradient vector G(u,v) of the function d(u,v), as well as the mean thickness th=th(u,v) and of the mean width wdth(u,v), of the ancient riverbed to be simulated. To simulate the thicknesses of the lobes or of the banks, the transfer function Tc(w|grad,th,wdth) cited above is replaced by other appropriate transfer functions.

At stage 108, these thicknesses e(u,v) are used to form a surface corresponding to the envelope of the riverbed facies that is located in three-dimensional geological space at a distance |e(u,v)| from the reference horizon H.

At stage 109, these thicknesses e(u,v) can likewise be used to mark as belonging to the ancient riverbed facies all points Q of three-dimensional geological space that are located below the reference horizon H and of which the projection P(u,v) on H is located at a distance that is less than or equal to the absolute value of the thickness of the sediment |e(u,v)|.

At stage 110, it is possible to choose to return to stage 104 to randomly generate a new realization of the random function R(u,v) which will have the effect of producing a new, equiprobable occurrence of a thickness of the ancient riverbed facies in geological space at stage 108.

Figure 3:
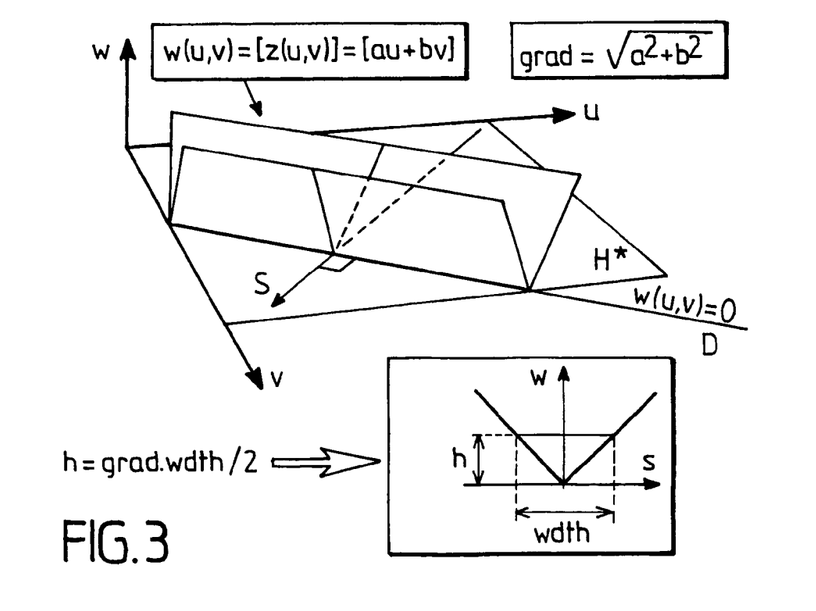
FIG. 3 schematically shows one example of modeling of the pseudo-valley.
Figure 4:
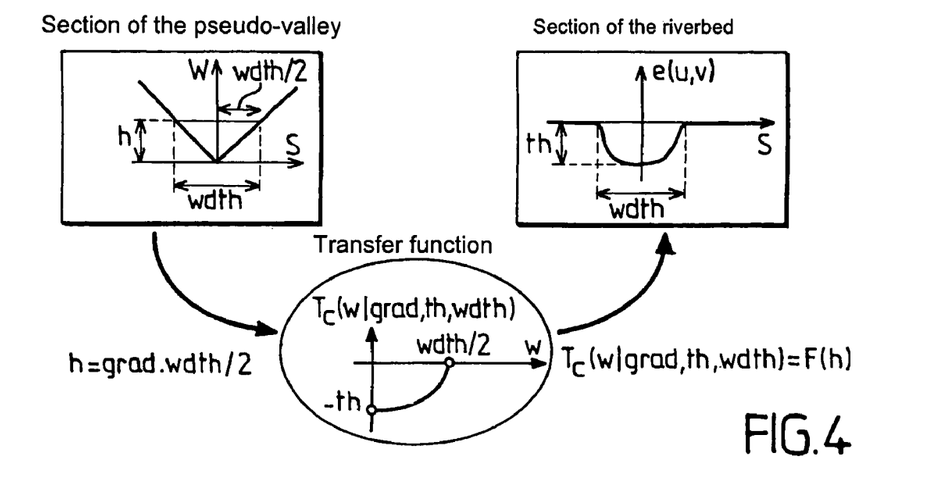
FIG. 4 schematically shows a transformation of the pseudo-valley for obtaining an ancient riverbed.

To facilitate an understanding of the stochastic simulation process of an ancient riverbed according to the invention, FIGS. 3 and 4 show one highly simplified example corresponding to the very special case where:

The modeling function d(x,y) shown in FIG. 3 is linear and has d(u,v)=au+bv for the equation. The gradient G(u,v) is thus a vector that has (a,b) as components in the parametric domain H* and its modulus "grad" is constant and equal to the square root of $(a^2+b^2)$. Moreover, the primary direction of the ancient riverbed is then the one corresponding to the vector of components (−b,a) in the parametric domain H*.

By simplification, the random perturbation function R(u,v) is assumed to be constantly equal to zero. This means that in this very special case the function w(u,v) is such that w(u,v) =|d(u,v)|.

As can be seen in FIG. 3, under the preceding simplifying hypotheses, the graph of function w(u,v) has the shape of a rectilinear pseudo-valley parallel to the direction (−b,a). Then it is possible to imagine filling this pseudo-valley with ancient riverbed facies up to a height h=grad*wdth/2, where grad is the constant gradient of d(u,v), whereas wdth is the desired mean width for the ancient riverbed.

The ancient riverbed that has been formed in this way has a reasonable width wdth, but has a thickness h and a sectional shape that are generally insufficient. To solve this problem, as shown in FIG. 4, a transfer function e(u,v)=Tc(w(u,v)|grad, th,wdth) is applied that has been chosen in order to take into account the desired shape of the sections and the thickness at the same time.

If at this point it is assumed that the random perturbation function R(u,v) is no longer identical to zero, then each realization r(u,v) of the latter function causes deformations that make the pseudo-valley sinuous. The parameters that define the autocorrelation function of R(u,v) can then be chosen as a function of the sinuosity, of the wavelength, and of the amplitude of the ancient riverbeds to be simulated. Moreover, the conditions applied to R(u,v) make it possible to constrain the ancient riverbed to pass by the points at which it is desired that it passes and that it not pass by the points that it is desired that it not pass.

Figure 5:
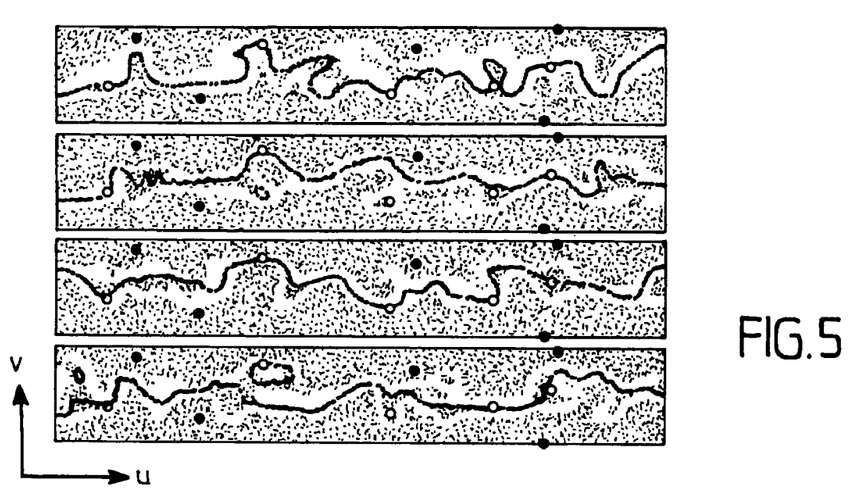
FIG. 5 schematically shows a set of four equiprobable simulations of the algebraic thicknesses of sediments obtained using the invention.

Thus FIG. 5 illustrates an example that shows an equiprobable series of simulated ancient riverbeds and that satisfies all the same constraints.

The generalization of the example described with reference to FIGS. 3, 4, and 5 thus makes it possible to determine all of a series of equiprobable geometries for an ancient riverbed and its associated geological dislocations under the following constraints:

the computed ancient riverbed must pass by data points corresponding to paleogeographic coordinates (u,v) given at locations from which the ancient riverbed has been observed;

the computed ancient riverbed must not pass by points of paleogeographic coordinates (u,v) given at locations from which it has been observed that the ancient riverbed is not present and that the ancient riverbed must avoid;

the ancient riverbed must correspond to a certain sinuosity, that is defined by a mean sinuosity, a mean wavelength, and a mean amplitude of the meanders;

the ancient riverbed must have a general direction corresponding to isovalue lines of the modeling function d(u, v);

the ancient riverbed and the associated bodies must have a mean thickness that is predetermined or is less than a predetermined value;

the ancient riverbed and the associated bodies must have a mean width that is predetermined or is less than a predetermined mean width.

It is important to note that the cited method for stochastically generating equiprobable simulations of ancient riverbeds can be extended in order to model the geological bodies associated with these ancient riverbeds, such as for example lobes and banks. To do this, it is sufficient to choose a suitable transfer function T, the application of which to any function w(u,v) will yield the algebraic thickness e(u,v)=T(w(u,v)) of the sediments corresponding to these geological bodies.

In FIG. 5, a set of four equiprobable realizations of the thickness of the riverbed facies are represented by gray levels. In these equiprobable realizations, the presence of white dots at locations where the ancient riverbed must pass and of black dots at locations that the ancient riverbed must avoid can be observed. These four equiprobable realizations are shown in this example according to a general direction parallel to the axis u : the invention extends, of course, to any orientation of the general direction independent of axes u and v.

With reference to FIG. 6, the lateral and downstream migrations of each simulated ancient riverbed are modeled. The two lateral and downstream migrations are then roughly superimposed on FIG. 6.

The lateral migration is obtained by replacing the perturbed modeling function z(u,v) with a parameterized perturbed modeling function $z_q(u,v)=d(u,v)+q \times r(u,v)$, where q is a parameter that varies between two real parameters (classically between 0 and 1). The topographic function is then replaced by $w^* = \min(|z_q(u, v)|)$, where the minimum is taken relative to the set of values of the parameter q. Migration downstream is obtained by a progressive transformation of the function r(u,v) (the simplest transformation being a translation of r in the direction of flow of the fairway).

One important advantage of the invention is the ability to have several equiprobable realizations of the ancient riverbed, as well as oxbow-lakes or closed meanders or cut-off meanders. The invention thus has major advantages over the prior art, which does not allow either simple modeling or simulation of this type of geological object.

Embodiments of the present invention may include, for example, a process for constrained stochastic simulation of ancient riverbeds or ancient associated geological structures in the neighborhood of a geological reference horizon H, comprising, e.g.: (a) parameterize the geological reference horizon H in the vicinity of a reference horizon H by linking to it a two-dimensional parametric net (u,v) of paleogeographic coordinates: (b) define a modeling function d(u,v) of the general direction of the ancient riverbed to be simulated such that d(u,v) becomes zero on the center line of the ancient riverbeds to be simulated: (c) construct a perturbed modeling function z(u,v)=d(u,v)+r(u,v), where r(u,v) is an equiprobable realization of a random stochastic perturbation function R(u,v);(d) use the absolute value of said perturbed modeling function z(u,v) of the general direction of the ancient riverbed to be simulated to define a topographic function of the pseudo-valley w(u,v)=|z(u,v)|; (e) transform the topographic function of the pseudo-valley w(u,v) into a sediment thickness e(u,v) by using a transfer function that has been chosen in such a manner as to satisfy the mean dimensions and characteristics of the shape of the ancient riverbed to be simulated and/or the ancient geological structures associated with this ancient riverbed. The topographic function w(u,v) of the pseudo-valley may be replaced by any monotonic increasing transformation of the absolute value of the perturbed modeling function z(u,v). The stochastic simulation constraints may comprise a set of points by which the ancient riverbed to be simulated must pass and a set of points by which the ancient riverbed must not pass.

The modeling function d(u,v) defining the general direction of the ancient riverbed to be simulated may be defined by conditions at the limits that are roughly parallel to the general direction of the ancient riverbed to be simulated. The modeling function of the general direction of the ancient riverbed to be simulated may be defined by conditions at limits that are essentially parallel to the general direction of the ancient riverbed to be simulated. The local directions of anisotropy of the correlation function of the stochastic perturbation function may be parallel and perpendicular, respectively, to the general direction of the ancient riverbed to be simulated.

Embodiments may include a computer package, comprising program code elements for executing the stages of the process, when the program is run by a computer. The program may be installed on a device for constrained stochastic simulation of ancient river beds or ancient geological structures associated with the nearby presence of a reference horizon H, comprising means for parameterizing the geological reference horizon H by linking to it a two-dimensional parametric net (u,v) of paleogeographic coordinates: means for defining a modeling function of the general direction of the ancient riverbed to be simulated: means for using the absolute value of said modeling function of the general direction of the ancient riverbed to be simulated for defining a topographical function of the pseudo-valley: means for transforming said topographical function of the pseudo-valley using a transfer function that makes it possible to constrain the dimensions and characteristics of the shape of the ancient riverbed to be simulated and/or the ancient geological structures associated with this ancient riverbed.

Embodiments may include a device for constrained stochastic simulation of ancient riverbeds or ancient geological structures associated with the nearby presence of a reference horizon H, comprising means for parameterizing the geological reference horizon H by linking to it a two-dimensional parametric net (u,v) of paleogeographic coordinates: means for defining a modeling function of the general direction of the ancient riverbed to be simulated: means for using the absolute value of said modeling function of the general direction of the ancient riverbed to be simulated for defining a topographical function of the pseudo-valley: means for transforming said topographical function of the pseudo-valley using a transfer function that makes it possible to constrain the dimensions and characteristics of the shape of the ancient riverbed to be simulated and/or the ancient geological structures associated with this ancient riverbed. Embodiments may comprise means for storage of stochastic simulation constraints, means of computation and parameterization, means of display and visualization of the dimensions and characteristics of the shape of the ancient riverbed to be simulated and/or the ancient geological structures associated with these ancient riverbeds.

The invention described with reference to one particular realization is in no way limited thereto, and can be implemented using a programmable device, or using a known type of device that incorporates a computer package that implements a process according to the invention.

The invention claimed is:

1. A process for constrained stochastic simulation and presentation of a simulation of an ancient riverbed or an ancient associated geological structure in the neighborhood of a geological reference horizon H, comprising:
   gathering data regarding ancient riverbeds or ancient associated geological structures using subsurface measurements; and
   using a programmable device:
   generating a reference horizon H using the gathered data;
   parameterizing the reference horizon H by linking to it a two-dimensional parametric net (u,v) of paleogeographic coordinates;
   defining a modeling function $d(u,v)$ of the general direction of the ancient riverbed, wherein $d(u,v)$ is defined over the parametric net (u,v) and wherein $d(u,v)$ becomes zero on the center line of the ancient riverbeds to be simulated;
   constructing a perturbed modeling function $z(u,v)=d(u,v)+r(u,v)$, where $r(u,v)$ is an equiprobable realization of a random stochastic perturbation function $R(u,v)$;
   using the absolute value of said perturbed modeling function $z(u,v)$ of the general direction of the ancient riverbed to define a topographic function of a pseudo-valley $w(u,v)=|z(u,v)|$;
   transforming said topographic function of the pseudo-valley $w(u,v)$ into a sediment thickness $e(u,v)$ by using a transfer function that yields the mean dimensions and characteristics of the shape of the ancient riverbed and/or the ancient geological structures associated with this ancient riverbed; and
   presenting a simulation of ancient riverbeds or ancient associated geological structures as a realization.

2. The process according to claim 1, wherein the topographic function $w(u,v)$ of the pseudo-valley is replaced by a monotonic increasing transformation of the absolute value of the perturbed modeling function $z(u,v)$.

3. The process according to claim 1, wherein the stochastic simulation constraints comprise a set of points by which the ancient riverbed must pass and a set of points by which the ancient riverbed must not pass.

4. The process according to claim 1, wherein the modeling function $d(u,v)$ defining the general direction of the ancient riverbed is defined by conditions at the limits that are substantially parallel to the general direction of the ancient riverbed.

5. The process according to claim 1, wherein the modeling function of the general direction of the ancient riverbed is defined by conditions at limits that are substantially parallel to the general direction of the ancient riverbed.

6. The process according to claim 1, wherein the local directions of anisotropy of the correlation function of the stochastic perturbation function are parallel and perpendicular, respectively, to the general direction of the ancient riverbed.

7. The process according to claim 1, comprising ensuring that the simulation of ancient riverbeds or ancient associated geological structures passes by data points corresponding to paleogeographic coordinates (u,v) given at locations from which the ancient riverbeds or ancient associated geological structures has been observed.

8. The process according to claim 1, comprising ensuring that the simulation of ancient riverbeds or ancient associated geological structures does not pass by data points corresponding to paleogeographic coordinates (u,v) given at locations from which the ancient riverbeds or ancient associated geological structures has not been observed.

* * * * *

UNITED STATES PATENT AND TRADEMARK OFFICE
CERTIFICATE OF CORRECTION

| | | |
|---|---|---|
| PATENT NO. | : 7,561,992 B2 | |
| APPLICATION NO. | : 11/100467 | |
| DATED | : July 14, 2009 | |
| INVENTOR(S) | : Bruno Leflon et al. | |

It is certified that error appears in the above-identified patent and that said Letters Patent is hereby corrected as shown below:

In the drawing sheets, consisting of Figs. 1-3, should be deleted to be replaced with the drawing sheets, consisting of Figs. 1-3, as shown on the attached pages.

Column 5, lines 41-47, should read:

-- To do this, for example it is possible to proceed as follows: choose the geometry of two open curves Ll and Lr that do not intersect and that are located on either side of the major axis of the ancient riverbeds to be simulated; construct d(u,v) by interpolation of the points located on Ll with a value [[(+V)]] (-V) and of the points located on Lr with a value [[(-V)]] (+V), where V is a randomly chosen constant. --

Signed and Sealed this
Fourteenth Day of February, 2012

David J. Kappos
*Director of the United States Patent and Trademark Office*